US012649832B2

(12) United States Patent (10) Patent No.: US 12,649,832 B2
Vautard (45) Date of Patent: Jun. 9, 2026

(54) METHOD OF MILLING RUBBER COMPOSITION HAVING GRAPHENE AND LIQUID RUBBER

(71) Applicant: Compagnie Generale des Etablissements Michelin, Clermont-Ferrand (FR)

(72) Inventor: Frederic Vautard, Knoxville, TN (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 536 days.

(21) Appl. No.: 18/259,725

(22) PCT Filed: Dec. 30, 2020

(86) PCT No.: PCT/US2020/067513
§ 371 (c)(1),
(2) Date: Jun. 28, 2023

(87) PCT Pub. No.: WO2022/146432
PCT Pub. Date: Jul. 7, 2022

(65) Prior Publication Data
US 2024/0076457 A1 Mar. 7, 2024

(51) Int. Cl.
| *C08J 3/21* | (2006.01) |
| *B29B 7/90* | (2006.01) |
| *B60C 1/00* | (2006.01) |
| *C08J 3/00* | (2006.01) |
| *C08K 13/02* | (2006.01) |
| *C08L 9/06* | (2006.01) |
| *B29K 507/04* | (2006.01) |
| *C08K 3/04* | (2006.01) |
| *C08K 3/06* | (2006.01) |
| *C08K 5/18* | (2006.01) |

(52) U.S. Cl.
CPC ................. *C08J 3/212* (2013.01); *B29B 7/90* (2013.01); *B60C 1/00* (2013.01); *C08J 3/005* (2013.01); *C08K 13/02* (2013.01); *C08L 9/06* (2013.01); *B29K 2507/04* (2013.01); *C08J 2309/06* (2013.01); *C08J 2447/00* (2013.01); *C08K 3/042* (2017.05); *C08K 3/06* (2013.01); *C08K 5/18* (2013.01); *C08K 2201/003* (2013.01); *C08L 2201/08* (2013.01); *C08L 2207/324* (2013.01)

(58) Field of Classification Search
None
See application file for complete search history.

(56) References Cited

U.S. PATENT DOCUMENTS

| 11,518,856 B2 * | 12/2022 | Vautard ................. B60C 1/0016 |
| 2017/0166722 A1 * | 6/2017 | Zhamu ..................... C08K 3/04 |
| 2022/0332016 A1 * | 10/2022 | Kutsovsky .............. B29B 7/002 |

FOREIGN PATENT DOCUMENTS

WO WO-2019133442 A1 * 7/2019 ................ C08L 9/06

* cited by examiner

*Primary Examiner* — Robert S Jones, Jr.
*Assistant Examiner* — Christiaan Roelofse
(74) *Attorney, Agent, or Firm* — John Steckler Schwab

(57) ABSTRACT
An improved rubber composition and method to create the improved rubber composition is achieved by milling reduced graphene oxide ("RGO") in liquid rubber to induce a reduction of bulk density of the reduced graphene oxide while maintaining dispersibility in rubber without using a solvent-based process resulting in an industrially scalable process and an improved rubber composition.

20 Claims, 4 Drawing Sheets

METHOD OF MILLING RUBBER COMPOSITION HAVING GRAPHENE AND LIQUID RUBBER

FIELD OF THE INVENTION

The subject matter of the present invention relates to milling of reduced graphene oxide ("RGO") in liquid rubber to induce industrially scalable reduction of bulk density while maintaining dispersibility in rubber without using a solvent-based process.

BACKGROUND OF THE INVENTION

Rubber mixes containing Reduced Graphene Oxides (RGO) showed interesting properties for tire design. They improved the rigidity/energy dissipation compromise versus conventional fillers (carbon black, silica). High values of rigidity were obtained at low RGO concentrations, therefore generating low levels of energy dissipation. But the strength of RGO rubber composites may be improved, as shown by a lower tensile modulus at high strain and lower values of stress and strain at break versus regular grade reinforcing carbon black. This may be due to re-stacking of graphene platelets during mixing, or a lack of covalent bonding with the rubber matrix. In addition, the product form of RGO is a fluffy powder which presents some challenges regarding its handling. The tap density is very low, and this is not compatible with industrial practices. The material must be carefully handled during storage, transportation and processing to avoid the product becoming airborne thereby presenting a combustion or inhalation hazard.

A need exists for an improved method for integrating RGO into rubber composites, particularly one that improves dispersion by limiting re-stacking, generates covalent bonding of the RGO with the matrix and assure good interfacial adhesion, and increases the tap density to levels that enable an easy handling of the powder. A potential solvent-free, scalable process, for decreasing the lateral size of the RGO platelets and grafting molecules on their surface at the same time is reactive grinding/milling.

Ball milling reduced graphene oxide was reported by Jeon, et al. in "Large-Seale Production of Edge-Selectively Funetionalized Graphene Nanoplatelets via Ball Milling and Their Use as Metal-Free Electrocatalysts for Oxygen Reduction Reaction", I.-Y. Jeon, H.-J. Choi, S.-M. Jung, J. M. Seo, M.-J. Kim, L, Dai, J.-B. Back, J. Am. Chem, Soc. 135 (2013) 1386-1393 (herein referred to as "Jeon et al."). Jeon et al. reported that they generated exfoliated edge-selectively functionalized graphene nanoplatelets (EFGnPs) 8 functionalized at the edges by milling graphite 1.0 in a planetary ball mill in the presence of a gas 4 such as hydrogen, dry ice, sulfur trioxide, or a mix of dry ice and sulfur trioxide, such as shown in FIG. 1. The milling media was coarse, made of 5 mm steel balls 12 and the time of grinding was 48 hours. This milling created active carbon 6 at the edges of the platelet. They proved that ball-milling graphite in a sealed container in the presence of dry ice was functionalizing the edges of the graphene sheets with carboxylic acid functionalities as described in "Edge-carboxylated graphene nanosheets via ball milling." I.-Y. Jeon, Y.-R. Shin, G.-J. Sohn, H.-J. Choi, S.-Y. Bae, J. Mahmood, S.-M. Jung, J.-M. Seo, M,-J. Kim, D. W. Chang, L, Dai, J.-B. Back; Proceedings of the National Academy of Sciences of the United States of America 109(15) (2012) 5588-5593.

While Jeon et al. provided a process to ball milling graphite, the industrial applicability of the process is left wanting and lacked sufficient dispersion and mechanical properties due to compaction of graphene platelets during the milling process, leading to poor dispersion and poor mechanical properties.

With the same principle, Wu et al. grafted polystyrene chains by ball-milling graphite for a few horns in a liquid media made of polystyrene resin (molecular weight=280 000 g/mol) dissolved in N,N-dimethylformamide as described in "One-step in situ ball milling synthesis of polymer-functionalized graphene nanocomposites." H. Wu, W. Zhao, H. Hu, G. Chen; J. Mater. Chem. 21 (2011) 8626-8632 ("Wu et al.").

Lastly, inventors A. Zhamu, and B. Z. Jang and Global Graphene Group (G3, Dayton. OH, USA), which is a RGO and GNP manufacturer, filed a PCT patent application, publication WO2017095512, describing the ball-milling of graphite in "plastic beads, plastic pellets, wax pellets, polymer powder or polymer reactor spheres" claiming that polymer chains could be extracted from the polymer in solid form and transferred to the surface of the produced "graphene-like" particles.

From the cited prior art it is evident that ball milling can be used to introduce functional groups on the graphene surface for improved interaction with rubber, and to reduce the bulk density of RGO to improve its industrial usability. What is needed is a method of ball milling that improves the state of dispersion of RGO obtained with conventional mixing technologies. A method that reduces airborne particles by use of a liquid media and prevents the RGO platelets from stacking and restacking during mixing by intercalating the platelets with another material and additionally increases the covalent bonding of the RGO with the matrix would be of particular interest.

A need exists for a RGO containing rubber and an industrial scalable method of blending. RGO with rubber resulting in such a rubber composition.

SUMMARY OF THE INVENTION

Aspects and advantages of the invention will be set forth in part in the following description, or may be obvious from the description, or may be learned through practice of the invention.

In at least one exemplary embodiment, Reduced Graphene Oxide (RGO) is milled in liquid rubber leads to a size reduction and a grafting of pendant elastomer chains without using a solvent-based process. The pendant chains help at improving the dispersion of the platelets, and if they have sufficient length, can bond covalently with the rubber matrix during vulcanization. Also, the process is an efficient compounding method that sharply decreases the tap density of the RGO powder and makes it compatible with industrial practices. It was also found that using liquid rubber during milling leads to better dispersion and mechanical properties compared to dry milling.

In another exemplary embodiment, a method of manufacturing a reduced graphene oxide reinforced rubber product is performed by milling the reduced graphene oxide with a liquid rubber to form a milled, material; mixing an uncured rubber elastomer; adding the milled material to the uncured rubber elastomer and mix; adding an anti-degradant package and mix; adding a curing package; milling the rubber mix until full incorporation of the curing package; placing the rubber composition in a mold; and applying heat and pressure to cure the rubber composition; and removing the cured reduced graphene oxide reinforced rubber product from the mold.

These and other features, aspects and advantages of the present invention will become better understood with reference to the following description and appended claims. The accompanying drawings, which are incorporated in and constitute a part of this specification, illustrate embodiments of the invention and, together with the description, sense to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
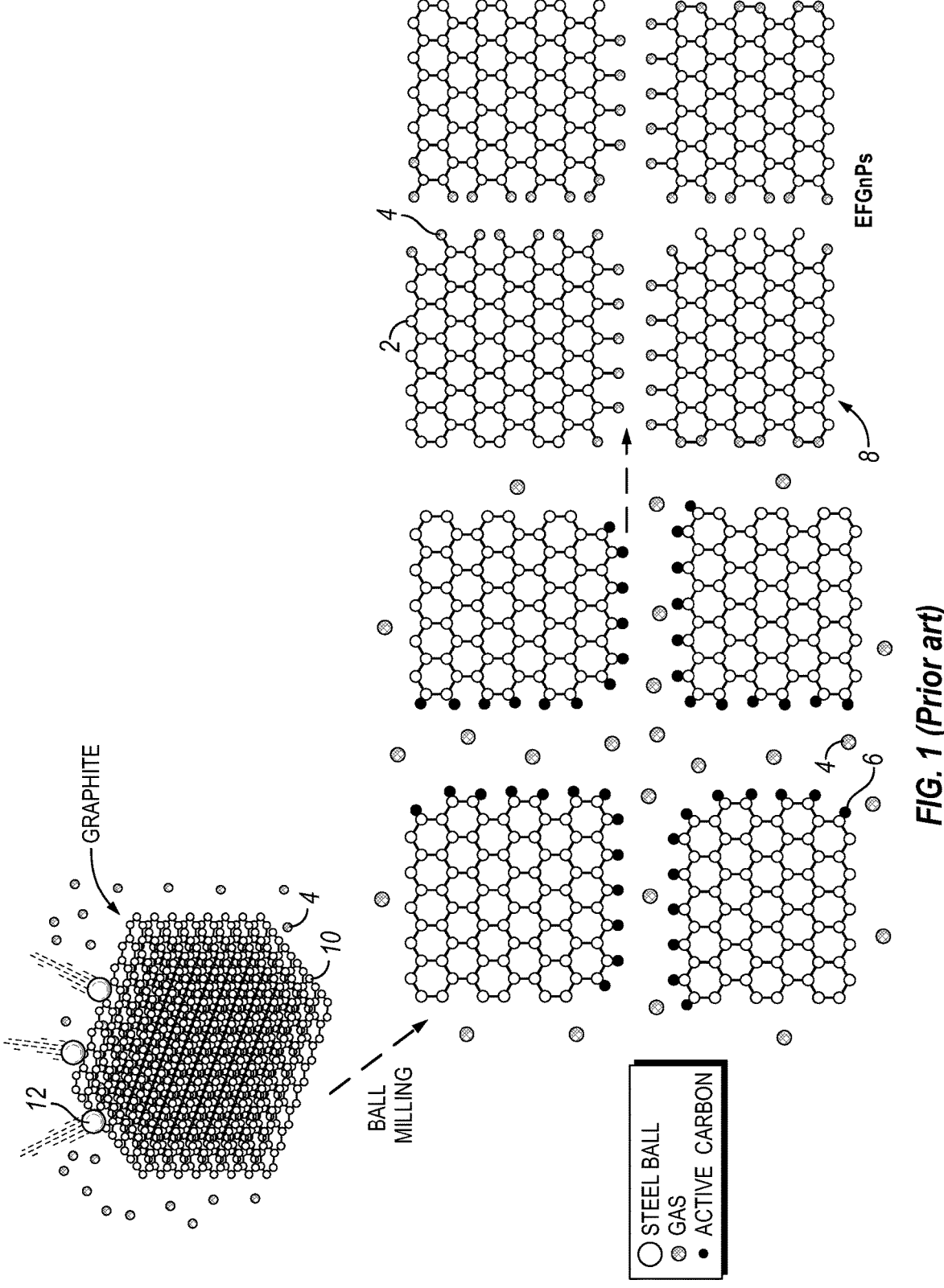
FIG. 1 shows a schematic of reactive ball-milling process involving, graphite.
Figure 2:
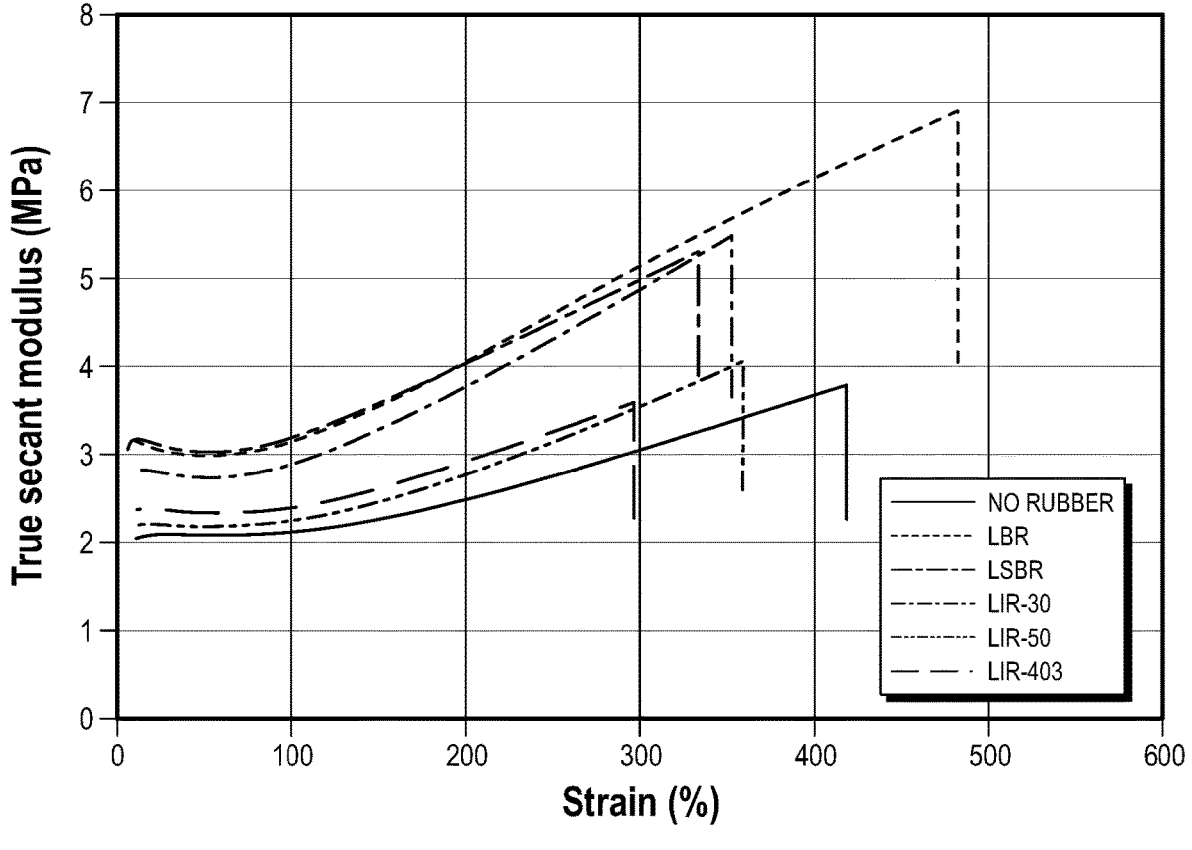
FIG. 2 shows the true secant modulus curves corresponding to N002 PDR milled with and without liquid rubber.

The present invention provides a method for creating a composite rubber composition comprising Reduced Graphene Oxide (RGO) by use of liquid rubber as a novel milling co-agent. For purposes of describing the invention, reference now will be made in detail to embodiments and/or methods of the invention, one or more examples of Which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

In at least one embodiment an RGO liquid rubber composition is created by combining RGO with liquid rubber in a suitable mill, for example a planetary ball mill, along with suitable milling media, for example stainless steel spheres 3-10 mm in diameter. In this embodiment the ambient air is purged and replaced with a less reactive covering gas, such as nitrogen. The RGO and liquid rubber is mechanically milled until the RGO particles reach the desired size. The RGO-liquid rubber mixture may then be added as an ingredient to a rubber formulation. In other embodiments the mill may be a twin-screw extruder or a Haake style mixer.

The rubber composition may then be further processed, a desired anti-degradant package and a curing package may be added to the rubber mixture. The uncured rubber mixture may be calendared into sheets or extruded as a product having a desired cross-sectional shape. These products may be combined with other reinforcements to form a composite structure. Finally the green rubber is placed into a mold where heat and pressure is applied to cure the rubber, forming a cured rubber product.

Example

Milling with Liquid Rubber

The Reduced Graphene Oxide (RGO) used in this study was N002 PDR from the Global Graphene Group (Dayton, OH, USA).

The physical properties of the different liquid rubbers are displayed in Table 1. The compositions of the rubber mixes made with the milled N002 PDR are displayed in Table 2.

TABLE 1

Physical properties of the liquid rubbers used in the study.

|  | LBR | L-SBR-841 | LIR-30 | LIR-50 | LIR-403 |
|---|---|---|---|---|---|
| Rubber type | Polybutadiene | Styrene butadiene copolymer (random) | polysoprene | polysoprene | polysoprene |
| Molecular weight (g · mol⁻¹) | 1500-2000 | 10 000 | 28 000 | 54 000 | 34 000 |
| Viscosity (Pa · s) | 80 (at 25° C.) | 100 (at 60° C.) | 70 (at 38° C.) | 500 (at 38° C.) | 200 (at 38° C.) |
| Pendant functional group | No | No | No | No | Maleic anhydride |

TABLE 2

Mix compositions in grams.

|  | Mix 1 PDR control | Mix 2 LBR | Mix 3 L-SBR-841 | Mix 4 LIR-30 | Mix 5 LIR-50 | Mix 6 LIR-403 |
|---|---|---|---|---|---|---|
| SBR2300 | 46.06 | 46.06 | 46.06 | 46.06 | 46.06 | 46.06 |
| Liquid Rubber | — | 2.52 | 2.52 | 2.52 | 2.52 | 2.52 |
| ZnO | 0.97 | 0.97 | 0.97 | 0.97 | 0.97 | 0.97 |
| SAD | 0.58 | 0.58 | 0.58 | 0.58 | 058 | 0.58 |
| 6PPD | 0.97 | 0.97 | 0.97 | 0.97 | 0.97 | 0.97 |
| N002 PDR | 2.19 | 2.19 | 2.19 | 2.19 | 2.19 | 2.19 |
| S | 0.71 | 0.71 | 0.71 | 0.71 | 0.71 | 0.71 |
| CBS | 0.71 | 0.71 | 0.71 | 0.71 | 0.71 | 0.71 |

Figure 3:
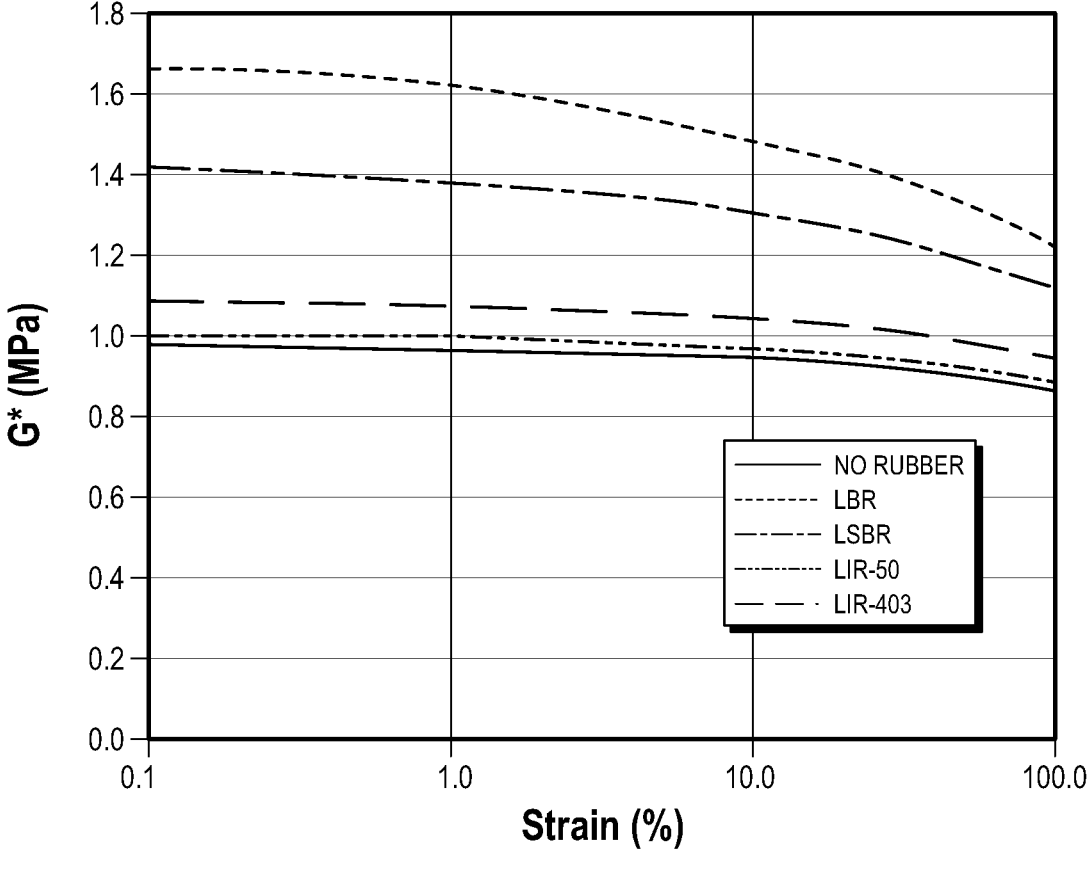
FIG. 3 shows G* of the dynamic mechanical analysis (DMA) of a strain sweep at 23° C.-return, corresponding to N002 PDR milled with and without liquid rubber.

For the grinding process, a planetary ball-mill MSK-SFM-1 from the MT1 Corporation was used with four 250 mL stainless-steel vacuum jars (FIG. 3). Stainless steel spherical milling media with diameter from 3 to 5 mm was used. Specifically, two 3-mm balls, three 4-mm balls and two 5-mm sized balls were placed in each, ar. Long milling times (8 hours, 4 hours in each rotation direction) were used.

Since the generated radicals at the surface of the broken RGO platelets could react with ambient oxygen, the jars were flushed with nitrogen for an hour before milling. At the end of the grinding process, the product was added to the rubber as is. No extra step of purification to remove the non-reacted liquid rubber from the surface of the "graphene-like" particles was performed.

For the control sample without any liquid rubber, the N002 PDR was compacted during ball-milling. N002 PDR is a very fluffy powder. A jar of 250 mL contained 1.26 g of N002 PDR with a tap density of approximately 0.005 kg·L⁻¹. After milling, the volume of the powder was reduced to approximately 15 mL with a resulting tap density of 0.090 kg·L⁻¹.

Rubber Mixing and Milling

The following processes were followed for mixing and milling of the rubber composite. A Haake mixer was used set for a rotation speed of 90 rpm and a temperature of 110° C. The rubber was mixed for 1 min. The rotation speed was reduced to 30 rpm and the milled material was added and mixed for 1 min. The rotation speed was then increased to 90 rpm and mixing continued 1 min. SAD (Steric Acid), ZnO (Zinc Oxide), and 6PPD (1-(1,3-dimethylbutyl)-n'-phenyl-p-phenylenediamine) were then added and mixed for another 1 min. The mixer piston was then dropped and mixing continued 1 minute.

After internal mixing, the mixture was milled on a 2-roll mill at 40° C. The mixture was milled for 12 passes after full incorporation of S (Sulfur) and CBS (n-cyclohexyl-2-ben-zothiazole sulfonamide).

Samples were then molded from the mixture for testing. Testing of the composition was carried out to determine the material's tensile properties. Milling without any liquid rubber resulted in the lowest MA (10) and MA (100) (FIG. 4 and Table 3), whereas milling the N002 PDR with the low molecular weight BR and the low molecular weight SBR led to the highest rigidity. The highest strain and strength at break were again obtained with the RGO milled in the lowest molecular weight liquid rubber (LBR with a molecular weight of 1500-2000 g·mol−1). The ratio MA 300 MA 100 was higher when the RGO was milled in liquid rubber versus dry milling and it was the highest with the low molecular weight BR or with the liquid isoprene having the lowest molecular weight (LIR-30). The trends regarding rigidity and reinforcement are clear: the lower the molecular weight of the liquid rubber used during milling (and consequently the lower its viscosity), the higher the rigidity and reinforcement of the corresponding rubber composite.

The size of the particles was examined with scanning electron microscopy, SEM. Similar size reduction occurred With both dry milling and milling with low molecular weight rubber, thus differences in particle size cannot explain the differences in mechanical properties.

It is therefore hypothesized that the decrease in rigidity and reinforcement is due to the stacking of the RGO platelets during dry milling. Using low molecular weight rubber prevents the platelets from stacking very tightly and promotes a better dispersion during mixing.

TABLE 4

Figure 4:
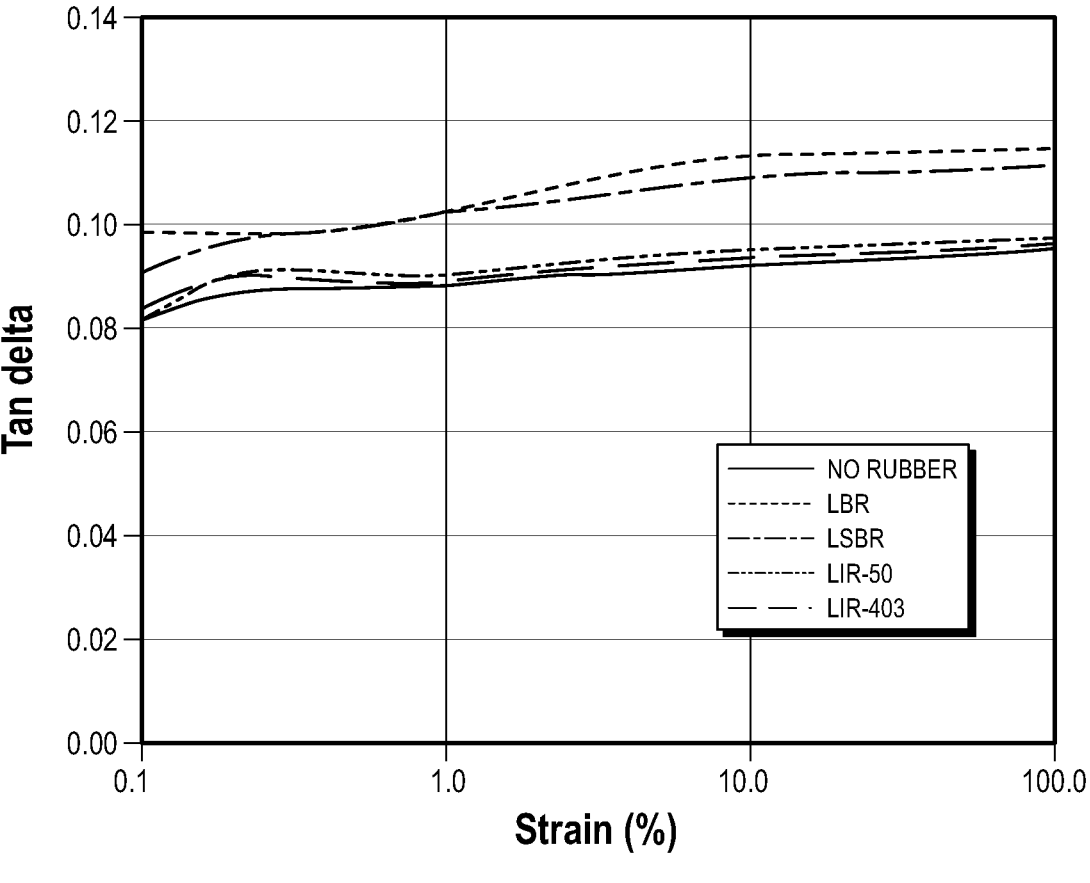
FIG. 4 shows the Tan delta of the dynamic mechanical analysis (DMA) of a strain sweep at 23° C.-return, corresponding to N002 PDR milled with and without liquid rubber.

| DMA indicators corresponding to FIG. 3 and FIG. 4. | | |
|---|---|---|
| | G*_10% (MPa) | Tan delta_10% |
| No rubber | 0.94 | 0.09 |
| LBR | 1.49 | 0.11 |
| LSBR | 1.31 | 0.11 |
| LIR-50 | 0.97 | 0.10 |
| LIR-403 | 1.04 | 0.09 |

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield, yet further embodiments. Additionally, certain features may be interchanged with similar devices or features not expressly mentioned which perform the same or similar function.

As used herein, the term "method" or "process" refers to one or more steps that may be performed in other ordering than shown without departing from the scope of the presently disclosed invention. Any sequence of steps is exemplary and is not intended to limit methods described herein to any particular sequence, nor is it intended to preclude adding steps, omitting steps, repeating steps, or performing steps simultaneously. As used herein, the term "method" or "process" may include one or more steps performed at least by one electronic or computer-based apparatus having a processor for executing instructions that carry out the steps.

The terms "a," "an," and the singular forms of words shall be taken to include the plural form of the same words, such that the terms mean that one or more of something is provided. The terms "at least one" and "one or more" are used interchangeably. Ranges that are described as being "between a and b" are inclusive of the values for "a" and "b."

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any

TABLE 3

| Tensile properties indicators corresponding to FIG. 4. | | | | | |
|---|---|---|---|---|---|
| | MA 10 (MPa) | MA 100 (MPa) | MA 300 (MPa) | Tensile stress at break (MPa) | Tensile strain at break (%) | MA 300/ MA 100 |
| No rubber | 2.04 ± 0.02 | 2.09 ± 0.01 | 3.01 ± 0.01 | 3.04 ± 0.10 | 417 ± 14 | 1.44 ± 0.01 |
| LBR | 3.11 ± 0.02 | 3.15 ± 0.03 | 5.16 ± 0.04 | 5.70 ± 0.29 | 480 ± 31 | 1.64 ± 0.01 |
| LSBR | 3.16 ± 0.04 | 3.21 ± 0.01 | 5.03 ± 0.02 | 4.09 ± 0.53 | 331 ± 52 | 1.56 ± 0.01 |
| LIR-30 | 2.83 ± 0.03 | 2.90 ± 0.02 | 4.89 ± 0.05 | 4.27 ± 0.28 | 351 ± 25 | 1.68 ± 0.01 |
| LIR-50 | 2.17 ± 0.07 | 2.23 ± 0.01 | 3.57 ± 0.01 | 3.16 ± 0.29 | 358 ± 31 | 1.60 ± 0.01 |
| LIR-403 | 2.35 ± 0.03 | 2.39 ± 0.02 | 3.63 ± 0.01 | 2.69 ± 0.27 | 295 ± 35 | 1.52 ± 0.01 |

Dynamic Properties

A strain sweep at 23° C. showed that the ranking in rigidity corresponded to the one obtained with MSV curves, FIG. 3, FIG. 4 and Table 4. Only the mixes made with N002 PDR milled in LBR or LSBR showed a slight Payne effect. Very limited energy dissipation (tan δ) was observed.

combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

What is claimed is:

1. A method of manufacturing a reduced graphene oxide reinforced rubber composition, the method comprising:
   milling the reduced graphene oxide with a liquid rubber to form a milled material;
   mixing an uncured rubber elastomer;
   adding the milled material to the uncured rubber elastomer and mixing;
   adding an anti-degradant package and mixing;
   adding a curing package
   milling the rubber mixture until full incorporation of the curing package.

2. The method of claim 1 wherein the liquid rubber has a molecular weight in the range of 1,500 g·mol$^{-1}$ to 54,000 g·mol$^{-1}$.

3. The method of claim 2 wherein the liquid rubber has a molecular weight in the range of 1,500 g·mol$^{-1}$ to 34,000 g·mol$^{-1}$.

4. The method of claim 3 wherein the liquid rubber has a molecular weight in the range of 1,500 g·mol$^{-1}$ to 28,000 g·mol$^{-1}$.

5. The method of claim 4 wherein the liquid rubber has a molecular weight in the range of 1,500 g·mol$^{-1}$ to 10,000 g·mol$^{-1}$.

6. The method of claim 5 wherein the liquid rubber has a molecular weight in the range of 1,500 g·mol$^{-1}$ to 2,000 g·mol$^{-1}$.

7. The method of claim 1 wherein the milling of the reduced graphene oxide and liquid rubber occurs in the absence of oxygen.

8. The method of claim 7 wherein the milling of the reduced graphene oxide and liquid rubber occurs in nitrogen.

9. The method of claim 8 wherein the milling of the reduced graphene oxide and liquid rubber occurs in a ball mill.

10. The method of claim 9 wherein the milling of the reduced graphene oxide and liquid rubber uses stainless steel media.

11. The method of claim 10 wherein the milling of the reduced graphene oxide and liquid rubber uses stainless steel media having a diameter in the range of 3 mm to 5 mm.

12. The method of claim 7 wherein the uncured rubber elastomer comprises styrene butadiene.

13. The method of claim 1 wherein the anti-degradant package comprises 6PPD.

14. The method of claim 1 wherein the curing package includes sulfur and an accelerator.

15. The method of claim 1 wherein the reduced graphene oxide reinforced rubber composition is placed into a mold and heated to form a cured rubber product.

16. A method of manufacturing a reduced graphene oxide reinforced rubber composition, the method comprising:
   milling the reduced graphene oxide with a liquid rubber in the absence of oxygen to form a milled material;
   mixing an uncured rubber elastomer;
   adding the milled material to the uncured rubber elastomer and mixing;
   adding an anti-degradant package and mixing;
   adding a curing package;
   milling the rubber mixture until full incorporation of the curing package.

17. The method of claim 16 wherein the liquid rubber has a molecular weight in the range of 1,500 g·mol$^{-1}$ to 34,000 g·mol$^{-1}$.

18. The method of claim 16 wherein the liquid rubber has a molecular weight in the range of 1,500 g·mol$^{-1}$ to 28,000 g·mol$^{-1}$.

19. The method of claim 16 wherein the liquid rubber has a molecular weight in the range of 1,500 g·mol$^{-1}$ to 10,000 g·mol$^{-1}$.

20. The method of claim 16 wherein the liquid rubber has a molecular weight in the range of 1,500 g·mol$^{-1}$ to 2,000 g·mol$^{-1}$.

* * * * *